United States Patent Office 3,234,229
Patented Feb. 8, 1966

3,234,229
NITROGEN COMPOUNDS OF POLYCHLORO-2-(TRICHLOROMETHYL)PYRIDINES
Carl T. Redemann, Huntington Beach, Calif., assignor to The Dow Chemical Company, Midland, Mich., a corporation of Delaware
No Drawing. Filed Mar. 6, 1962, Ser. No. 177,756
4 Claims. (Cl. 260—296)

This invention is concerned with nitrogen compounds of polychloro-2-(trichloromethyl)pyridines comprising basic nitrogen derivatives of polychloro-2-(trichloromethyl)pyridines and their acid addition salts. In these derivatives, the nitrogen containing group occupies the 4-position on the pyridine nucleus and is derived from ammonia, amines and other basic nitrogen compounds. Thus, these nitrogen derivatives may be represented by the formula

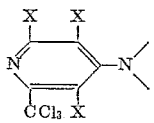

In this and succeeding formulas, each X is hydrogen or chloro and at least two of the X's are chloro. Each of the free valences in the non-nuclear nitrogen in the above formula is connected to carbon, hydrogen or nitrogen. The apparent oxidation state of said nitrogen is from −3 to 0, inclusive. Thus, excluded are oxidized nitrogen radicals such as nitroso or nitro. The free valences may be satisfied with radicals such as hydrogen, alkyl, alkenyl, alkynyl, hydroxyalkyl, aralkyl, cycloalkyl, amino, dialkylamino, guanyl, aminoalkyl, poly(aminoalkylene)aminoalkyl, pyridyl, pyrimidinyl, triazyl, provided at least one of the free valences is joined to hydrogen or carbon; alternatively the free valences may be joined with a divalent group which with the nitrogen forms a heterocyclic ring such as ethyleneimine, trimethyleneimine, pyrrolidine, alkylpyrrolidine, piperidine, alkylpiperidine, piperazine, alkylpiperazine and morpholine. Moreover, the compounds of the present invention embrace those having two polychloro-2-(trichloromethyl)pyridine nuclei, joined either directly through the nitrogen or through a divalent group interconnecting the nitrogens; these compounds may be better illustrated by a modified formula

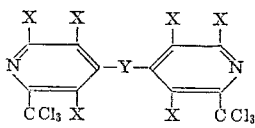

wherein Y may be —NHNH—, —(NHC$_m$H$_{2m}$)$_x$NH—, —NHC$_n$H$_{2n}$NH—,

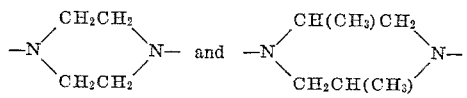

wherein $m$, $n$ and $x$ are integers, or alkylene diamines which may have aminoalkyl or hydroxyalkyl substituents.

The products of the present invention are white or light colored crystalline solids soluble in isopropyl alcohol, dimethylformamide, dimethyl sulfoxide and in alcoholic and aqueous mineral acids. These products are useful as herbicides and are adapted to be employed for the control of pre-emergent seedlings as well as emerging plants. The compounds are also useful as insecticides and fish poisons.

The compounds of particular interest are (a) compounds having the formula

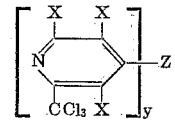

and (b) acid addition salts thereof. In this and succeeding formulas, Z is a residue of a nitrogen base and $y$ is an integer of at least 1 and may be as high as the number of basic nitrogens having a replaceable hydrogen in said nitrogen base. By "nitrogen base" is meant a basic nitrogen compound having at least one replaceable hydrogen grouping, HN<, and having a basic dissociation constant, $K_b$, of $10^{-7}$ or greater. Such nitrogen base which may also be termed "amine compound" may be represented by the formula, HZ. Inasmuch as the compopnds of the present invention are 4-amino- or substituted 4-amino derivatives of polychloro-2-(trichloromethyl)pyridines, the expression "4-amino-polychloro-2 - (trichloromethyl)pyridine compounds" is employed hereinafter to embrace the substituted amino products as well as the unsubstituted amino products.

The 4-amino-polychloro - 2 - (trichloromethyl)pyridine compounds of the present invention may be prepared by the reaction of a polychloro-2-(trichloromethyl)pyridine, namely, a tri- or tetrachloro-2-(trichloromethyl)pyridine having the formula

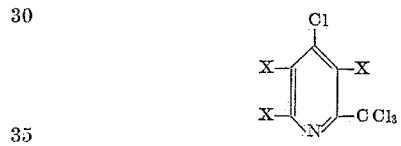

with a nitrogen base having the formula, HZ, to produce the desired product and hydrogen chloride by-product.

Certain of the compounds may be prepared by specific methods which will become evident from the following specification and working examples.

In the preparation of 4-amino-polychloro-2-(trichloromethyl)pyridine compounds by the reaction of tri- or tetrachloro-2-(trichloromethyl)pyridines and a nitrogen base, HZ, the suitable nitrogen bases or amine compounds include ammonia, aliphatic, alicyclic and heterocyclic mono- and polyamines, as well as such basic or amine compounds as guanidine, hydrazine and alkyl or aralkyl hydrazines. Preferred aliphatic monoamines are those which may be designated mono- and di-alkylamines, alkynylamines, alkynylamines, hydroxyalkylamines and aralkylamines. Examples of such amines include ethylamine, n-propylamine, isobutylamine, sec.-amylamine, 2-methyl-n-butylamine, 1,3-dimethylbutylamine, n-hexylamine, 3-amino-n-hexane, 4-amino-n-heptane, 2-amino-n-heptane, n-nonylamine, n-octylamine, decylamine, undecylamine, dodecylamine, tetradecylamine, hexadecylamine, 1,1,3,3-tetramethylbutylamine, 2-amino-2-methylbutane, pentadecylamine, heptadecylamine, hexahydrobenzylamine and other monoalkylamines containing from 1 to 18 carbon atoms, inclusive, diethylamine, diisopropylamine, di-n-butylamine, ethylmethylamine, diisoamylamine, dioctylamine, methylisopropylamine, N-methyldecylamine, N-methyl-sec.-butylamine, N-methyldodecylamine, N-methyltetradecylamine, N-methyloctadecylamine, N-ethyloctadecylamine, ethylpropylamine, N-n-butyltetradecylamine, bis(1,3-dimethylbutyl)amine, N-methyl-2-amino-n-pentane, di-n-heptylamine and other dialkylamines containing from 2 to 20 carbon atoms, inclusive, allylamine, methallylamine, oleylamine, 5-amino-1-pentene, 5-amino-2-hexene, and other alkenylamines containing from 3 to 18 carbon atoms, inclusive, α-phenylethylamine, β-phenylethylamine, 1-phenylpropylamine, 2-phenylpropylamine, α-amino-n-butylbenzene, 3,5-dimethylbenzylamine, 3-phenylpropylamine, γ-amino-n-butylbenzene, 4 - methylbenzylamine, 3-methylbenzylamine, 2-methylbenzylamine, N-ethylbenzylamine, N-methylbenzylamine and other aralkylamines containing from 7 to 10 carbon atoms, inclusive, 2-aminopropyl alcohol, 3-amino-n-pentanol, isopropanolamine, 2-amino-n-pentanol-3, 3-aminopropyl alcohol, 1-amino-2-butanol, diethanolamine, methylaminoethanol, ethylaminoethanol, isopropylaminoethanol, n-butylaminoethanol, bis(β-hydroxypropyl)amine, bis(β-hydroxyethyl)amine and other hydroxyalkyl amines containing from 2 to 6 carbon atoms, inclusive, propargylamine, and other alkynylamines.

Aliphatic polyamines suitable as reactants are those wherein at least one of the amine nitrogens has a replaceable hydrogen and wherein two or more of the amine nitrogens may have replaceable hydrogens. The particular arrangement of the carbon chain is not critical as long as at least two amino nitrogens are present and at least one has a replaceable hydrogen. The polyamines may also contain a hydroxy radical in its structure. Suitable aliphatic polyamines include ethylenediamine, diethylenetriamine, triethylenetetramine, tetraethylenepentamine, propylenediamine, 3,3' - diaminodipropylamine, 1,3-diaminobutane, unsymmetrical-diethylethylenediamine, symmetrical-diethylethylenediamine, hexamethylenediamine, tetramethylenediamine, trimethylenediamine, pentamethylenediamine, 1,2,3-triaminopropane, 1,3-diamino-2-propanol, N - hydroxyethylpropylenediamine, and other aliphatic polyamines containing from 2 to 8 carbon atoms, inclusive.

Suitable alicyclic amines are primary and secondary amines having a cycloalkyl group having from 3 to 6 carbon atoms, inclusive, in the cyclic radical and having a total carbon content of from 3 to 12, inclusive. Included are hydroxy and amino substituted cycloalkylamines. Examples of suitable alicyclic amines include cyclopropylamine, cyclobutylamine, cyclopentylamine, cyclohexylamine, 2-ethylcyclohexylamine, N-methylcyclohexylamine, N-ethylcyclohexylamine, dicyclohexylamine, 1,2-diaminocyclohexane, 2-aminocyclohexanol, etc.

Heterocyclic amines suitable for the preparation of the compounds of the present invention are those which may be designated as non-aromatic heterocyclic nitrogen compounds wherein the basic nitrogen is part of the ring structure and those which are "aromatic" nitrogen heterocyclic compounds which also has an amino substituent on the ring as the basic nitrogen. Examples of the non-aromatic heterocyclic include ethyleneimine, trimethyleneimine, pyrrolidine, piperidine, 2-methylpyrrolidine, 3-methylpyrrolidine, 3-ethylpiperidine, 2,5-dimethylpyrrolidine, 2,4-dimethylpyrrolidine, 2-methylpiperidine, 3-methylpiperidine, 2,6-dimethylpiperidine, 4-ethylpiperidine, 2-ethylpiperidine, 2,2,4-trimethylpiperidine, piperazine, 5-methyl-2-pyrazoline, trans-2,5-dimethylpiperazine, morpholine and other heterocyclic non-aromatic nitrogen bases having a ring size of from 3 to 6 atoms, inclusive, and a total carbon content of from 2 to 8, inclusive. The suitable "aromatic" heterocyclic nitrogen bases are 5 and 6 membered rings containing at least one —NH$_2$ radical and which may also contain from 1 to 2 methyl groups. Examples of suitable amines include 2-aminopyridine, 6-amino-α-picoline, 5-amino-α-picoline, 3-amino-γ-picoline, 3,4-diaminopyridine, 2,4-diaminopyridine, 2,5-diaminopyridine, 2,6-diaminopyridine, 2-aminopyrimidine, 4-aminopyrimidine, 5-amino-3-methyl-1,2,4-triazole, and other amino-substituted nitrogen heterocyclic compounds containing no more than 7 carbon atoms and having a basic dissociation constant greater than $10^{-7}$. Certain other basic nitrogen compounds react with polychloro-2-(trichloromethyl)pyridines to produce compounds having the desired properties of the products of the present invention. Included among such compounds are guanidine, hydrazine and alkyl or aralkyl hydrazines such as methylhydrazine, unsymm.-dimethylhydrazine, ethylhydrazine, etc.

The reaction between the polychloro-2-(trichloromethyl)pyridine and nitrogen base may be carried out at a temperature in the range of from about 15° to about 100° C. The amounts of reactants may vary from substantially equimolar proportions to a substantial excess of the amine or nitrogen base reactant. With most nitrogen base reactants, at least a twofold molar excess is employed, the excess base functioning to react with the hydrogen chloride by-product. With many nitrogen base reactants the physical properties are suitable for use as solvents, and a large excess is employed so that the reactant may also function as solvent. An additional non-nitrogenous solvent may also be employed, if desired. Suitable solvents for carrying out the reaction include methanol, ethanol, isopropyl alcohol, n-butanol, n-amyl alcohol, toluene or mixtures thereof. Frequently, an inorganic basic agent is employed to react with the hydrogen chloride by-product. Suitable inorganic bases for such use include potassium or sodium carbonate and sodium or potassium hydroxide.

The preferred procedure for carrying out the reaction will vary with the particular amine compound to be prepared. Thus, when the amine reactant is a gas or volatile material, the reaction is preferably carried out in a closed vessel at autogenous pressure. With low boiling amines or where moderating effect is desired, the reactants are mixed together in a solvent and heated at reflux temperature. With amines having moderate boiling points at atmospheric pressures or when more rigorous conditions are desired such a reaction at more than one basic site in a polyamine nucleus, the polychloro-2-(trichloromethyl)pyridine compound is mixed with an excess of the amine and heated at reflux temperature. With certain amines, particularly those in which use of excess may be undesirable from an economic standpoint or which for one reason or other require a more efficient hydrogen chloride scavenger than the amine itself, the reaction is carried out in the presence of an inorganic base agent.

In the preparation of 4-amino-polychloro-2-(trichloromethyl)pyridine compounds from polychloro-2-(trichloromethyl)pyridine and nitrogen base wherein said nitrogen base is a gaseous or readily volatile material, the appropriate polychloro-2-(trichloromethyl)pyridine compound is intimately mixed with excess, on a molar basis, of the nitrogen base or amine compound and the resulting mixture placed in a pressure vessel. The vessel is sealed and heated for a period of from about ½ to about 2 hours to a temperature of from about 80° to 110° C. As a result of these operations, a reaction takes place with the formation of the desired 4-amino-polychloro-2-(trichloromethyl)pyridine compound. The product is isolated by cooling the pressure vessel to a temperature well below the boiling point of the nitrogenous reactant. When the reactant is ammonia, cooling to a temperature of about −80° C. is desirable. After cooling to the appropriate temperature, the vessel is opened and the mixture allowed to warm to room temperature. Most of the excess unreacted amine evaporates at ambient temperature; residual amine is removed by vaporization, either by application of heat, subjecting the mixture to reduced pressure or both. The product is thus obtained as residue and may be purified, if desired, by conventional procedures such as treatment with activated charcoal, chromatographic separation or recrystallization.

When the nitrogen base reactant is non-gaseous and not excessively volatile under existing conditions, it is heated with an appropriate polychloro-2-(trichloromethyl)pyridine, with or without added solvent, at reflux temperature. The amount of amine may vary from a small to a large excess on a molar basis with respect to the polychloro-2-(trichloromethyl)pyridine reactant. The heating is carried out over a period of from about 1 hour to several days to obtain the desired 4-aminopolychloro-2-(trichloromethyl)pyridine product. After completion of the reaction, the product may be isolated and purified by conventional procedures. Thus, the amine hydrochloride and unreacted nitrogenous base is removed by washing with water or dilute aqueous acid. During the washing step, the product frequently precipitates as a crystalline solid, but may remain as an oily residue. The residue may be extracted with ether and thereafter purified with decolorizing carbon or by employing crystallization or chromatographic separation techniques. Alternately, the products may sometimes be isolated by forming a crystalline hydrochloride or dilituarate salt.

It is to be noted that in the compounds of the present invention, the (trichloromethyl) radical occupies an α position with respect to the hetero nitrogen. The α positions are numbered 2 and 6. Although generically, the compounds of the present invention are referred to as 4-aminopolychloro-2-(trichloromethyl)pyridine compounds, it is to be understood that in certain compounds, the (trichloromethyl) group may preferably be designated as occupying the 6 position.

The following examples illustrate the present invention but are not to be construed as limiting.

*Example 1.—4-amino-3,5-dichloro-2-(trichloromethyl) pyridine*

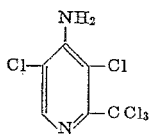

2.5 grams (0.0083 mole) of 3,4,5-trichloro-2-(trichloromethyl)pyridine and 50 milliliters (2.4 moles) of anhydrous ammonia at −80° C. were sealed in a pressure vessel and thereafter heated for 1 hour at 100° C. At the end of this period, the reaction mixture was cooled to −80° C., the pressure released and then allowed to warm to room temperature to evaporate unreacted ammonia. As a result of these operations, there remained as residue the desired 4-amino-3,5-dichloro-2-(trichloromethyl)pyridine compound. The latter was recrystallized from 60 percent aqueous acetic acid to obtain a purified compound as colorless prisms melting at 137°–138° C.

*Example 2*

In operations carried out in a manner similar to that described in Example 1, the following compounds are prepared:

4-amino-2,3,5-trichloro-6-(trichloromethyl)pyridine having a melting point of 118°–120° C. by the reaction of 2,3,4,5-tetrachloro-6-(trichloromethyl)pyridine and ammonia.

4-amino-2,3-dichloro-6-(trichloromethyl)pyridine having a melting point of 81°–84° C. by the reaction of 2,3,4-trichloro-6-(trichloromethyl)pyridine and ammonia.

4-amino-2,5-dichloro-6-(trichloromethyl)pyridine having a molecular weight of 280 by the reaction of 2,4,5-trichloro-6-(trichloromethyl)pyridine and ammonia.

*Example 3.—4-(2-aminoethyl)amino-3,5-dichloro-2-(trichloromethyl)pyridine*

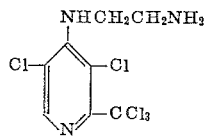

6.0 grams (0.02 mole) of 3,4,5-trichloro-2-(trichloromethyl)-pyridine and 5 grams (0.08 mole) of ethylenediamine were added to a mixture of 25 milliliters of methanol and 25 milliliters of isopropyl alcohol. The resulting mixture was boiled at reflux temperature for 16 hours and thereafter cooled to 4° C. and diluted with 100 milliliters of ice water. As a result of these operations, a tan colored solid separated and precipitated in the mixture. The latter was recovered by filtration, treated with decolorizing carbon and recrystallized from carbon tetrachloride to obtain 5.8 grams (94 percent) of 4-(2-aminoethyl)-amino-3,5-dichloro-2-(trichloromethyl)pyridine product as light yellow crystals melting at 119°–120° C.

*Example 4*

In reactions carried out in a manner similar to that described in Example 3, the following compounds are prepared:

3,5-dichloro-4-methylamino-2-(trichloromethyl)pyridine melting from 140° to 142° C. by the reaction of 3,4,5-trichloro-2-(trichloromethyl)pyridine and methylamine.

3,5-dichloro-4-ethylamino-2-(trichloromethyl)pyridine having a molecular weight of 308 by the reaction of 3,4,5-trichloro-2-(trichloromethyl)pyridine and ethylamine.

3,5-dichloro-4-hydrazino-2-(trichloromethyl)pyridine having a melting point of 171°–172° C. by the reaction of anhydrous hydrazine and 3,4,5-trichloro-2-(trichloromethyl)pyridine.

4-(2-(2-aminoethyl)aminoethylamino)-3,5-dichloro-2-(trichloromethyl)pyridine monohydrochloride melting from 170° to 200° C. with decomposition by the reaction of diethylenetriamine and 3,4,5-trichloro-2-(trichloromethyl)pyridine.

4-(3-(3-aminopropyl)aminopropylamino)-2,3-dichloro-6-(trichloromethyl)pyridine monohydrochloride having a molecular weight of 394 by the reaction of 3,3'-diaminodipropylamine and 2,3,4-trichloro-6-(trichloromethyl)pyridine.

2,3,5-trichloro-4-isopropylamino-6-(trichloromethyl)-pyridine having a molecular weight of 356 by the reaction of isopropylamine and 2,3,4,5-tetrachloro-6-(trichloromethyl)pyridine.

*Example 5*

In reactions carried out in a manner similar to that described in Examples 3 and 4, the following compounds are prepared:

3,5-dichloro-4-piperazino-2-(trichloromethyl)pyridine monohydrochloride melting from 192° to 195° C. with decomposition by the reaction of piperazine and 3,4,5-trichloro-2-(trichloromethyl)-pyridine in toluene solvent.

3,5-dichloro-4-propynylamino-2-(trichloromethyl) pyridine melting at 137°–138° C. by the reaction of propynylamine and 3,4,5-trichloro-2-(trichloromethyl) pyridine in n-butanol solvent.

4-((6-aminohexyl)amino)-2,3-dichloro-6-(trichloromethyl)-pyridine having a molecular weight of 379 by the reaction of hexamethylenediamine and 2,3,4-trichloro-6-(trichloromethyl)pyridine in n-butanol solvent.

4-n-amylamino-3,6-dichloro-2-(trichloromethyl)pyridine having a molecular weight of 362 by the reaction of n-amylamine and 3,4,6-trichloro-2-(trichloromethyl) pyridine in amyl alcohol solvent.

3,5-dichloro-4-dimethylamino-2-(trichloromethyl) pyridine having a melting point of 72°–73° C. by the reaction of dimethylamine and 3,4,5-trichloro-2-(trichloromethyl)pyridine in n-butanol solvent.

3,5-dichloro-4-morpholino-2-(trichloromethyl)pyridine melting from 108.5° to 112° C. by the reaction of morpholine and 3,4,5-trichloro-2-(trichloromethyl)pyridine in n-butanol solvent.

2,3,5-trichloro-4-methylamino-6-(trichloromethyl) pyridine melting from 81° to 87° C. by the reaction of 40% aqueous methylamine and 2,3,4,5-tetrachloro-6-(trichloromethyl)pyridine in ethanol solvent.

2,3,5-trichloro-4-dimethylamino-6-(trichloromethyl) pyridine having a melting point of 52.5°–54.5° C. by the reaction of 25% aqueous dimethylamine and 2,3,4,5-tetrachloro-6-(trichloromethyl)pyridine in ethanol solvent.

2,3,5 - trichloro-4-pyrrolidino-6-(trichloromethyl)pyridine melting from 98° to 103° C. by the reaction of pyrrolidine and 2,3,4,5 - tetrachloro-6-(trichloromethyl)pyridine in ethanol solvent.

2,3 - dichloro - 4-((2-diethylaminoethyl)amino)-6-(trichloromethyl)pyridine having a molecular weight of 379 by the reaction of unsym.-diethylethylenediamine and 2,3,4-trichloro-6-(trichloromethyl)pyridine in n-butanol solvent.

2,5 - dichloro-4-((2-ethylcyclohexyl)amino)-6-(trichloromethyl)pyridine having a molecular weight of 395 by the reaction 2-ethylcyclohexylamine and 2,4,5-trichloro-6-(trichloromethyl)pyridine in toluene solvent.

2,5 - dichloro-4-(2-pyridylamino)-6-(trichloromethyl)pyridine having a molecular weight of 357 by the reaction of 2-aminopyridine and 2,4,5-trichloro-6-(trichloromethyl)pyridine in toluene solvent.

2,3 - dichloro - 4-(2-pyrimidinylamino)-2-(trichloromethyl)pyridine having a molecular weight of 358 by the reaction of 2,3,4 - trichloro-6-(trichloromethyl)pyridine and 2-aminopyrimidine in toluene solvent.

2,3,5 - trichloro - 4-hydrazino-6-(trichloromethyl)pyridine having a melting point of 114°–116° C. by the reaction of anhydrous hydrazine and 2,3,4,5-tetrachloro-6-(trichloromethyl)pyridine in ethanol solvent.

*Example 6.—4,4'-ethylenediimino-bis(3,5-dichloro-2-(trichloromethyl)pyridine)*

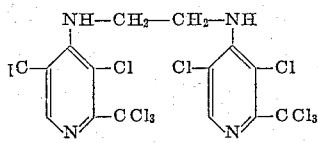

6 grams (0.02 mole) of 3,4,5-trichloro-2-(trichloromethyl)-pyridine and 1.4 grams (0.023 mole) of ethylenediamine were heated together at 100° C. for 24 hours. At the end of this period, the reaction mixture was allowed to cool to room temperature, agitated with 20 milliliters of 1-normal hydrochloric acid and thereafter refrigerated at 4° C. to precipitate as crystalline material the desired 4,4' - ethylenediiminobis(3,5-dichloro-2-(trichloromethyl)pyridine)product. The latter was recovered by filtration and recrystallized from glacial acetic acid to obtain a purified product melting from 205° to 207° C.

*Example 7*

In preparations carried out in a manner similar to that described in Example 6, the following compounds are prepared:

4,4'-hydrazobis(3,5-dichloro-2 - (trichloromethyl))pyridine melting at 193°–193.5° C. by the reaction of anhydrous hydrazine and 3,4,5-trichloro-2-(trichloromethyl)pyridine.

4-pyrrolidino-3,5-dichloro-2 - (trichloromethyl)pyridine melting at 104°–105° C. by the reaction of pyrrolidine with 3,4,5-trichloro-2-(trichloromethyl)pyridine.

4-piperidino-3,5-dichloro-2 - (trichloromethyl)pyridine having a melting point of 96°–97° C. by the reaction of piperidine and 3,4,5-trichloro-2 - (trichloromethyl)pyridine.

4-cyclohexylamino - 3,5-dichloro-2 - (trichloromethyl)pyridine having a melting point of 72°–73° C. by the reaction by cyclohexylamine and 3,4,5-trichloro-2-(trichloromethyl)pyridine.

4-allylamino-3,5-dichloro-2 - (trichloromethyl)pyridine melting at 93°–94° C. by the reaction of allylamine with 3,4,5-trichloro-2-(trichloromethyl)pyridine.

4-benzylamino-3,5 - dichloro-2 - (trichloromethyl)pyridine melting at 63.5°–64.5° C. by the reaction of benzylamine with 3,4,5-trichloro-2-(trichloromethyl)pyridine.

4-n-butylamino-3,5-dichloro - 2-(trichloromethyl)pyridine melting at 36°–38° C. by the reaction of n-butylamine and 3,4,5-trichloro-2-(trichloromethyl)pyridine.

2,3,5-trichloro-4 - ((4-pentenyl)amino) - 6-(trichloromethyl)-pyridine having a molecular weight of 381 by the reaction of 5-amino-1-pentene and 2,3,4,5-tetrachloro-6-(trichloromethyl)pyridine.

2,3-dichloro-4-methallylamino - 6-(trichloromethyl)pyridine having a molecular weight of 334 by the reaction of methallylamine and 2,3,4-trichloro-6-(trichloromethyl)pyridine.

2,5-dichloro-4 - ((2-phenylethyl)amino-6 - (trichloromethyl)pyridine having a molecular weight of 384 by the reaction β-phenylethylamine and 2,4,5-trichloro-6-(trichloromethyl)pyridine.

3,5-dichloro-4-n-octylamino - 2-(trichloromethyl)pyridine having a molecular weight of 296.5 by the reaction of octylamine and 3,4,5-trichloro-2-(trichloromethyl)pyridine.

ω-N,N'-[4,4'-bis)3,5-dichloro - 2-(trichloromethyl)pyridine)]-diethylenetriamine having a molecular weight of 629 by the reaction of diethylenetriamine and 3,4,5-trichloro-2-(trichloromethyl)pyridine.

4,4'-trimethylenediimino - bis(3,5-dichloro-2-(trichloromethyl)pyridine) having a molecular weight of 600 by the reaction of trimethylenediamine and 3,4,5-trichloro-2-(trichloromethyl)pyridine.

4,4'-propylenediimino-bis(2,3,5 - trichloro-6-(trichloromethyl)pyridine (having a molecular weight of 669 by the reaction of propylenediamine and 2,3,4,5-tetrachloro-6-(trichloromethyl)pyridine.

4,4'-tetramethylenediimino - bis(2,5-dichloro-6-(trichloromethyl)pyridine) having a molecular weight of 614 by the reaction of tetramethylenediamine and 2,4,5-trichloro-6-(trichloromethyl)pyridine.

4,4'-hexamethylenediimino - bis(2,3-dichloro-6-trichloromethyl)pyridine) having a molecular weight of 642 by the reaction of hexamethylenediamine and 2,3,4-trichloro-6-(trichloromethyl)pyridine.

1,4 - [4,4'-bis(3,5 - dichloro-2 - (trichloromethyl)pyridine)]piperazine having a molecular weight of 642 by the reaction of piperazine and 3,4,5-trichloro-2-(trichloromethyl)pyridine.

*Example 8.—4-n-octadecylamino-3,5-dichloro-2-(trichloromethyl)pyridine*

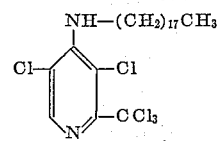

2.2 grams (0.008 mole) of n-octadecylamine, 2.5 grams (0.008 mole) of 3,4,5-trichloro-2-(trichloromethyl)pyridine and 1.3 (0.009 mole) grams of powdered potassium carbonate were mixed together and heated at 100° C. for 4 hours. At the end of this period, the reaction mixture was cooled to room temperature and 30 milliliters of ethyl ether and 20 milliliters of water added thereto. The resulting mixture was agitated, the immiscible phases separated and the ether phase evaporated to dryness to obtain an oily residue. The oily residue was dissolved in 25 milliliters of paraffin hydrocarbon mixture having a boiling point of 208°–278° F. and passed through a column of activated alumina. The column was treated with an additional amount of said solvent and thereafter with benzene to separate the mixture of products and to recover the desired 4-n-octadecylamino-3,5-dichloro-2-(trichloromethyl)pyridine product in the benzene solution. The product was recovered by evaporating the effluent solution to dryness and drying the residue under reduced pressure over paraffin shavings. The product consisted of colorless crystals melting from 30° to 32° C.

*Example 9*

In preparations carried out in a manner similar to that described in Example 8, the following compounds are prepared:

4-(2-hydroxyethylamino) - 3,5-dichloro - 2 - (trichloromethyl)pyridine melting from 88° to 90° C. by the reaction of ethanolamine and 3,4,5-trichloro-2-(trichloromethyl)pyridine in the presence of potassium carbonate.

2,3,5-trichloro-4 - n-hexadecylamino-6 - (trichloromethyl)pyridine having a molecular weight of 539 by the reaction of n-hexadecylamine and 2,3,4,5-tetrachloro-6-(trichloromethyl)pyridine in the presence of potassium carbonate.

2,3 - dichloro-4 - n-dodecylamino-6 - (trichloromethyl)pyridine having a molecular weight of 448 by the reaction of n-dodecylamine and 2,3,4-trichloro-6-(trichloromethyl)pyridine in the presence of potassium carbonate.

2,5-dichloro-4-n-octylamino-6 - (trichloromethyl)pyridine having a molecular weight of 392 by the reaction of n-octylamine and 2,4,5-trichloro-6-(trichloromethyl)pyridine in the presence of potassium carbonate.

2,3-dichloro-4-((2-hydroxypropyl)amino)-6-(trichloromethyl)pyridine having a molecular weight of 338 by the reaction of isopropanolamine and 2,3,5-trichloro-6-(trichloromethyl)pyridine in the presence of potassium carbonate.

2,3-dichloro-4-bis(2-hydroxyethyl)amino)-6-(trichloromethyl)pyridine having a molecular weight of 369 by the reaction of diethanolamine and 2,4,5-trichloro-6 - (trichloromethyl)pyridine in the presence of potassium carbonate.

2,3-dichloro-4-bis(2-hydroxypropyl)amino - 6 - (trichloromethyl)pyridine having a molecular weight of 397 by the reaction of diisopropanolamine and 2,3,4-trichloro-6-(trichloromethyl)pyridine in the presence of potassium carbonate.

3,5-dichloro-4-((3-phenylpropyl)amino)-2 - (trichloromethyl)pyridine having a molecular weight of 398 by the reaction of 3,4,5-trichloro-2 - (trichloromethyl)pyridine and 3-phenylpropylamine in the presence of potassium carbonate.

2,3,5-trichloro-4-((4-methylbenzyl)amino) - 6 - (trichloromethyl)pyridine having a molecular weight of 419 by the reaction of 4-methylbenzylamine and 2,3,4,5-tetrachloro-6-(trichloromethyl)pyridine in the presence of potassium carbonate.

3,5-dichloro-4-((2-hydroxycyclohexyl)amino)-2 - (trichloromethyl)pyridine having a molecular weight of 378 by the reaction of 3,4,5-trichloro-2-(trichloromethyl)pyridine and 2-aminocyclohexanol in the presence of potassium carbonate.

3,5-dichloro-4-(6-methyl-2 - pyridylamino) - 2 - (trichloromethyl)pyridine having a molecular weight of 371 by the reaction of 6-amino-α-picoline and 3,4,5-trichloro-2-(trichloromethyl)pyridine in the presence of potassium carbonate.

*Example 10.—1-(3,5-dichloro-2-(trichloromethyl)-4-pyridyl)guanidine diliturate*

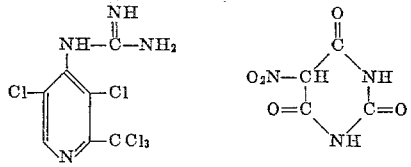

3.0 grams (0.01 mole) of 3,4,5-trichloro-2-(trichloromethyl)pyridine was added to a methanolic solution of guanidine obtained by treating 4.8 grams (0.044 mole) of guanidine nitrate with a solution of 1.6 grams of sodium hydroxide in 35 milliliters of methanol and removing the precipitated sodium nitrate by filtration. The resulting mixture of the pyridine compound and guanidine was heated to the boiling point and maintained at reflux temperature for 3 days. At the end of this period, the reaction mixture was heated under reduced pressure to vaporize the methanol and to recover a residue which was thereafter heated with 10 milliliters of water at boiling temperatures. The resulting aqueous mixture was decanted to remove the water and the remaining oil dissolved in 20 milliliters of methanol. The solution was added to a solution of 3 grams of 5-nitrobarbituric acid in 300 milliliters of methanol. The methanolic solution was heated to boiling and a small amount of insoluble material removed by filtration and thereafter concentrated until crystallization commenced. The mixture was thereafter cooled to obtain the diliturate of 1-(3,5-dichloro - 2 - (trichloromethyl)-4-pyridyl)guanidine product which decomposed without melting when heated.

*Example 11.—4-amino-2,3,5-trichloro-6-(trichloromethyl)pyridine*

25 milliliters of anhydrous ammonia and 15 grams (0.045 mole) of 3,4,5,6-tetrachloro-2-(trichloromethyl)-pyridine were placed in a pressure vessel and heated at 100°–115° C. for one and one-half hours to obtain the desired 4-amino-2,3,5-trichloro-6 - (trichloromethyl)pyridine product. After completion of the heating the mixture was allowed to cool and thereafter was washed with water and extracted with methylene chloride. The methylene chloride was vaporized to recover the product as residue. The product after recrystallization from aqueous alcohol and hexane melted from 113° to 118° C.

The 4-amino-polychloro-2 - (trichloromethyl)pyridine compounds of the present invention are useful as herbicides for the control of both pre-emergent seedlings and emerging plants. These products are particularly valuable for the control of broad-leafed plants and such use may be illustrated by the following representative operations. In separate operations, aqueous compositions containing about 0.24% by weight of one of the following 4-amino-polychloro-2-(trichloromethyl)pyridine compounds were prepared: 4-amino-3,5-dichloro-2 - (trichloromethyl)pyridine, 4-methylamino-2,3,5-trichloro-6 - (trichloromethyl)-pyridine, 4-(2-aminoethyl)amino-3,5-dichloro - 2 - (trichloromethyl)pyridine, 3,5-dichloro-4-hydrazino - 2 - (trichloromethyl)pyridine, 3,5-dichloro-4-methylamino - 2-(trichloromethyl)pyridine, 3,5-dichloro-4 - (2 - hydroxyethyl)amino-2-(trichloromethyl)pyridine, 3,5-dichloro - 4-dimethylamino-2-(trichloromethyl)pyridine and 4-benzyl-amino-3,5-dichloro-2 - (trichloromethyl)pyridine. These compositions were applied to separate beds at a rate of about 160 pounds per acre and the beds thereafter planted with known number of seeds of tomato plants. A check operation was also carried out wherein no 4-amino-polychloro-2-(trichloromethyl)pyridine compounds were applied to the beds but were planted with the same number of tomato seeds. The beds were maintained under greenhouse conditions normally producing good seed germination. After thirteen days, the seedlings which had appeared in each bed were counted and measured for height. It was found that in the beds which had been treated with a 4-amino-polychloro-2 - (trichloromethyl)pyridine compound prior to planting, there was substantially complete absence of emergent seedlings whereas in the check beds, there was emergency of healthy seedlings from substantially all the planted seeds.

The products of the present invention are also useful as pesticides for the control of domestic, argricultural and aquatic pests. Representative pests controlled by the compounds of the present invention include housefly, American cockroach, 2-spotted spider mite, bean aphid, lake emerald shiner, northern fat-headed minnow and carp.

Control of domestic pests may be illustrated by the following representative operations. In separate tests, flies were contacted with aqueous dispersions containing 500 p.p.m. of 4-benzylamino-3,5-dichloro-2 - (trichloromethyl)pyridine, 4-allylamino-3,5-dichloro-2 - (trichloromethyl)pyridine, 3,5-dichloro-4-dimethylamino - 2 - (trichloromethyl)pyridine, 4-amino-2,3,5-trichloro - 6 - (trichloromethyl)pyridine and 4-amino-3,5-dichloro-2 - (trichloromethyl)pyridine. After three days mortality counts were made. It was found that each of the above dispersions gave complete kill of house flies.

Control of agricultural pests may be illustrated by the following representative operations. In separate tests, cranberry bean plants infested with adult and egg stages of two-spotted spider mite were contacted with aqueous dispersion containing 500 p.p.m. of 4-amino-2,3-dichloro-6-(trichloromethyl)pyridine or 3,5-dichloro-4-dimethylamino-2-(trichloromethyl)pyridine. The treated plants were maintained in the greenhouse for about three days and thereafter inspected to determine the control of the mites. It was found that complete controls of the plants pests were obtained.

Control of aquatic pests may be illustrated by the following operations. Aqueous media were treated to provide concentration therein of one of the following in concentration of 500 p.p.m.: 4-amino-2,3,5-trichloro-6-(trichloromethyl)pyridine and 4-amino-3,5-dichloro-2-(trichloromethyl)pyridine. Lake emerald shiners were placed therein and observed after 24 hours. Complete control of the pests were obtained.

The 3,4,5-trichloro-2-(trichloromethyl)pyridine starting material may be prepared by photochemical chlorination of α-picoline at a temperature of from about 50° to 150° C. in the presence of a small quantity of water as reaction solvent for time sufficient for completion of the reaction as indicated by the amount of hydrogen chloride by-product gas evolved from the reaction mixture. After completion of the reaction, the reaction mixture is fractionally distilled to recover 3,4,5-trichloro-2-(trichloromethyl)pyridine.

The 2,3,4-trichloro-6-(trichloromethyl)pyridine, 2,4,5-trichloro-6-(trichloromethyl)pyridine and 2,3,4,5-tetrachloro-6-(trichloromethyl)pyridine starting materials may be prepared by chlorinating 4,5-dichloro-2-(trichloromethyl)pyridine, 3,4-dichloro-2-(trichloromethyl)pyridine and 3,4,5-trichloro-2-(trichloromethyl)pyridine, respectively, at a temperature of from about 110° to about 160° C. under anhydrous conditions as more fully described and claimed in a co-pending application of Howard Johnston and Mary S. Tomita, Serial No. 152,624.

The preferred compounds of the present invention are those which may be represented by the formula in column 1 when $y$ has the value of 1.

I claim:
1. A compound selected from the group consisting of compounds of the formula

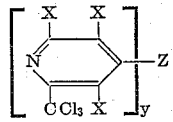

and the acid addition salts thereof, wherein in the above formula, each X is selected from the group consisting of hydrogen and chloro and at least two X's are chloro, Z is a residue of a nitrogen base having a basic dissociation constant of at least $10^{-7}$ and having at least one hydrogen on the basic nitrogen, and $y$ is an integer of at least 1 and as large as the number of basic nitrogens in the nitrogen base having a replaceable hydrogen, wherein said nitrogen base is selected from the group consisting of (a) ammonia, (b) monoalkylamines containing from 1 to 18 carbon atoms, inclusive, (c) dialkylamines containing from 2 to 20 carbon atoms, inclusive, (d) alkenylamines containing from 3 to 18 carbon atoms, inclusive, (e) alkynylamine containing 3 carbon atoms, (f) hydroxyalkylamines containing from 2 to 6 carbon atoms, inclusive, (g) aralkylamines containing from 7 to 10 carbon atoms, inclusive, (h) alkylenepolyamines containing from 2 to 8 carbon atoms, inclusive, and inclusive of alkylenepolyamines containing from 0 to 2 substituents, inclusive, selected from the group consisting of amino, hydroxy, N-lower hydroxyalkyl and N-lower alkyl wherein lower is from 1 to 2 carbons, inclusive, (i) alicyclic amines containing in the carbocyclic ring from 3 to 6 carbon atoms, inclusive, with a total carbon content of as many as 12 carbon atoms and inclusive of alicyclic amines containing from 0 to 1 substituent selected from the group consisting of lower alkyl, amino, hydroxy, N-lower alkyl and N-cyclohexyl wherein lower is from 1 to 2 carbons, inclusive, (j) alkyleneimines having a ring size of from 3 to 6 atoms, inclusive, a total carbon content of from 2 to 8, inclusive, and inclusive of alkyleneimines having from 0 to 3 lower alkyl substituents, inclusive, wherein lower is from 1 to 2 carbons, inclusive, (k) non-aromatic heterocyclic amines having a ring size of from 5 to 6 atoms wherein two of the atoms are nitrogen and the remainder carbon, and inclusive of amines containing from 0 to 2 methyl substituents, inclusive, (l) morpholine, (m) aromatic heterocyclic amines having a ring size of from 5 to 6 atoms of which from 1 to 3 atoms are nitrogen and the remainder carbon, and containing at least one amino radical and inclusive of amines containing an additional amino radical and from 0 to 2 methyl radicals, inclusive, wherein the total carbon content is no greater than 7, (n) guanidine, and (o) hydrazine, inclusive of mono- and di-lower alkylhydrazines wherein lower is from 1 to 2 carbons, inclusive.

2. 4-amino-3,5-dichloro-2-(trichloromethyl)pyridine.
3. 4 - amino - 2,3,5 - trichloro - 6 - (trichloromethyl)pyridine.
4. 4 - methylamino - 2,3,5 - trichloro - 6 - (trichloromethyl)pyridine.

References Cited by the Examiner

Klingsberg, "Pyridine and Its Deriv.," Pt. 2, p. 308 (1961).

WALTER A. MODANCE, *Primary Examiner.*

DUVAL T. McCUTCHEN, *Examiner.*